United States Patent [19] [11] 4,395,360
Albizatti et al. [45] Jul. 26, 1983

[54] CATALYST COMPONENTS AND CATALYSTS FOR THE POLYMERIZATION OF ALPHA-OLEFINS

[75] Inventors: Enrico Albizatti, Arona; Enzo Giannetti, Novara; Umberto Scata, Ferrara, all of Italy

[73] Assignee: Montedison S.p.A., Milan, Italy

[21] Appl. No.: 256,235

[22] Filed: Apr. 21, 1981

[30] Foreign Application Priority Data

Apr. 22, 1980 [IT] Italy ............................... 21535 A/80

[51] Int. Cl.³ ................................................ C08F 4/64
[52] U.S. Cl. .................................. 252/429 B; 526/125
[58] Field of Search ...................................... 252/429 B

[56] References Cited

U.S. PATENT DOCUMENTS 3,784,481 1/1974 Lassau et al. ............... 252/429 B X
4,076,924 2/1978 Toyota et al. ............... 252/429 B X
4,115,319 9/1978 Scata et al. ...................... 252/429 B
4,143,223 3/1979 Toyota et al. ............... 252/429 B X

FOREIGN PATENT DOCUMENTS 2014164A 8/1979 United Kingdom .

Primary Examiner—Patrick Garvin

[57] ABSTRACT

Catalyst components for the polymerization of olefins are disclosed. Said components comprise the solid product of the reaction of a halogenated Ti compound and of an electron-donor compound not containing active H atoms with the solid product of the reaction between an electron-donor compound containing active H atoms and a Mg dihalide obtained by decomposition, with halogenating agents other than the above halogenated Ti compound, of product (d) obtained from the reaction between an organometallic Mg compound of formula $R_mMgX_n$ is which R is a hydrocarbon or —OR group, X is halogen or a group R, OR, or COX' (X' being halogen), $0 < m \leq 2$, $0 < n < 2$ and $m+n$ is 2; and a Si compound selected from polysiloxanes, hydropolysiloxanes, silanols and polysilanols.

6 Claims, No Drawings

CATALYST COMPONENTS AND CATALYSTS FOR THE POLYMERIZATION OF ALPHA-OLEFINS

BACKGROUND OF THE INVENTION

The application of Umberto Scata et al Ser. No. 87,395 filed Oct. 22, 1979 and now abandoned, (and refiled under Rule 60 on Feb. 26, 1981; being now Ser. No. 238,647), describes catalysts for polymerizing alpha-olefins prepared by reacting a Ti compound and an electron-donor compound not containing active hydrogen atoms with a carrier based on Mg dihalide in the form of a complex with electron-donor compounds containing active hydrogen atoms, the Mg dihalide being obtained by decomposition of an organometallic Mg compound, containing at least one R or OR group bound to the Mg atom, wherein R is an alkyl, aryl, cycloalkyl or alkenyl radical having 1 to 20 C. In said Mg compound the remaining valence is saturated by a halogen, a radical R, OR or COX' in which R has the meaning already specified and X' is a halogen.

The catalysts obtained from such catalytic components have improved characteristics with respect to the catalysts obtained by decomposition of the above-mentioned organometallic Mg compounds prior to this invention.

Published British patent application No. 2,014,164 A describes catalysts for polymerizing olefins, consisting of the reaction product of Al-alkyls with a solid catalytic component prepared by reacting a Ti compound and an electron-donor compound with a carrier based on Mg dihalide obtained by decomposition with halogenating agents other than Ti compounds, of the reaction product (d) between an organometallic Mg compound and a hydropolysiloxane compound.

The activity of the catalysts obtained is acceptable only if the decomposition of reaction product (d) is effected in the presence of an aromatic hydrocarbon solvent such as, for example, toluene, xylene, benzene, capable of dissolving reaction product (d) and operating at temperatures not higher than 85° C.

THE PRESENT INVENTION

One object of this invention is to provide components of catalysts useful in the polymerization of olefins which yield final catalysts having improved properties as compared to catalysts prepared heretofore from the afore-mentioned Mg dihalides obtained by decomposition of reaction product (d).

This and other objects are accomplished by the present invention according to which we have found that, surprisingly, it is possible to prepare catalyst components and catalysts for polymerizing olefins having improved characteristics in respect of the catalysts obtained from the above-mentioned Mg dihalides prepared by decomposition of reaction product (d), without employing the conditions considered as essential in the British patent application No. 2,014,164 A.

Furthermore, we have found that it is possible to obtain good results also by using, as Si compounds, for obtaining (d), polysiloxanes, silanols and polysilanols.

The catalyst components of the invention are solid products prepared by reacting:

(a) a Ti compound containing at least a Ti-halogen bond;

(b) an electron-donor compound not containing active hydrogen atoms (ED), reacted as such or as a complex with an electron-acceptor (or Lewis acid) or with product (c); with (c) the solid product of the reaction between at least an electron-donor compound containing active hydrogen atoms (HED) and a Mg dihalide or a complex of same with (ED) compounds, the Mg dihalide being obtained by decomposition, with halogenating agents other than the Ti compounds used in (a), of reaction product (d) of an organometallic Mg compound with a Si compound selected from polysiloxanes, polyhydrosiloxanes, silanols and polysilanols.

The organometallic Mg compounds used for preparing (d) have general formula $R_mMgX_n$ containing at least one bond Mg-R, Mg-OR in which R is an alkyl, aryl, cycloalkyl or alkenyl radical having 1 to 20 carbon atoms and X is a halogen, in particular chlorine, bromine, iodine or is R, OR, or COX', in which R has the meaning already specified and X' is a halogen, m is $0 < m \leq 2$; n is $0 < n < 2$ and m+n equals 2.

The reaction product (d) can be prepared according to various methods. A presently preferred method consists in reacting an organometallic Mg compound with a Si compound. The resulting reaction product is then decomposed with halogenating agents different from the Ti compounds employed in (a).

The Si compound is added dropwise to the organometallic Mg compound under stirring at room temperature, the reaction being highly exothermic. At the end of the addition, the reaction mixture is preferably heated to 50°–100° C. for 1–5 hours to complete the reaction. The molar ratio between the Si compound and the organometallic Mg compound is comprised between 0.05 to 10, preferably between 1 to 2.

Preferred organic Mg compounds are Mg-monoalkyls, Mg-phenyls and Mg-dialkyls.

Specific examples are n-butyl-magnesium chloride, phenyl-magnesium chloride, n-butyl-magnesium-butoxy, n-propyl-magnesium-diethyl, benzyl-magnesium-chloride.

The methods of preparing the $R_mMgX_n$ compounds are well-known in the literature (see for example Chem. Ind. (1960) 1544; Tetrahedron Letters (1962) 631).

The organometallic Mg compounds can be utilized as such or in the form of complexes with ethers or amines (examples of such complexes are described in British patent No. 1,343,781) or with organometallic compounds of elements such as Al, Zn, B, Si, or with metal alcoholates such as Ti- and Zr-tetra-alcoholates, Al-alcoholates.

The above-mentioned compounds are reacted, preferably, in the form of solutions in hydrocarbons or of complexes thereof soluble in hydrocarbons.

The Si compounds are selected from the polysiloxanes, hydropolysiloxanes, silanols and polysilanols.

The polysiloxanes, either linear or cyclic, are Si compounds containing the monomeric unit

wherein R is equal to R' or different from R', wherein R is an alkyl, aryl, alkoxy or aryloxyl, and R' is a halogen, alkyl, aryl or cycloalkyl having 1 to 20 carbon atoms, the degree of polymerization of the polysiloxanes varying from 2 to 1000.

Examples of polysiloxanes are the polymers of alkyl siloxane, aryl siloxane, alkyl-aryl siloxane, cyclosiloxanes.

Examples of alkyl siloxanes are octomethyl trisiloxane, octomethyl tetracyclosiloxane, dimethyl polysiloxane, diethyl polysiloxane, methylethyl disiloxane, α,ω-dihydroxymethyl polysiloxane, etc.

Examples of aryl siloxanes are hexaphenyl cyclotrisiloxane, diphenyl polysiloxane, etc.

Examples of alkylaryl siloxanes are diphenyl octomethyl tetrasiloxane, methylphenyl polysiloxane, etc.

Examples of cyclosiloxanes are hexamethyl cyclotrisiloxane, octomethyl cyclotetrasiloxane, octomethyl tetracyclosiloxane, hexaphenyl cyclotrisiloxane, etc.

In practice it is possible to employ silicium oils having a viscosity up to 100,000 centistokes at 25° C.

The hydropolysiloxanes, either linear or cyclic, are Si compounds in which the monomeric unit has the general formula:

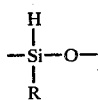

wherein R=H, a halogen, an alkyl having 1 to 10 carbon atoms, an aryl, alkoxyl, aryloxyl or a carboxylic group, and wherein the polymerization degree varies from 2 to 1000, preferably from 3 to 100.

Examples of such polyhydroxysiloxanes are: $(CH_3)_3SiO[(CH_3)HSiO]_nSi(CH_3)_3$, $(CH_3HSiO)_4$, $(CH_3HSiO)_3$, $H_3Si-O-SiH_2-OSiH_3$ and phenyl hydrosiloxane, in which the hydrogen atoms can be partially substituted by metal groups.

The silanols have formula $R_nSi(OH)_{4-n}$, in which $1 \leq n \leq 3$ and R is H, an alkyl, aryl or a cycloalkyl, an arylalkyl or a cycloarylalkyl, having 1 to 20 carbon atoms.

The silanols can be easily prepared by hydrolysis of the corresponding chlorides.

Examples of these compounds are trimethylsilanol, triethylsilanol, triphenylsilanol, diphenyldisilanol and butyltrisilanol.

The polysilanols can be prepared by hydrolysis of the corresponding organohalosilanes of general formula $R_cSiX_d$, where R is a hydrocarbon radical and X is a halogen, c=1,2, d=2,3 and c+d=4, in a $H_2O$ excess or in aqueous solution of a base in an inert hydrocarbon such as, for example, heptane, cyclohexane or toluene, at temperatures ranging from −50° to 100° C., and by washing the reaction mixture to neutrality of the solution.

The degree of polymerization of a polysilanol can be controlled by controlling the temperature in the case of hydrolysis, and by controlling the concentration of the base in the aqueous solution when an aqueous solution of a base in an inert hydrocarbon is used.

The polysilanols can be produced, also, by heating one or more of the above-mentioned silanols at temperatures higher than 50° C. in the presence of a base.

The polysilanols have various structures depending on the method employed to prepare them.

The polysilanols prepared from organohalosilanes have general formula $(RSi)_x(OH)_yO_z$, wherein R is a hydrocarbon and x, y ≥ 2 and z ≥ 1.

Examples of useful polysilanols are: polyphenylsilanol, polyethylsilanol, polybenzylsilanol.

The processes by which products (d) resulting from the reaction between the organometallic Mg compound and Si compound can be transformed, at least partially, to Mg-dihalide are known in the literature.

They consist in reacting the reaction product (d) with a halogenating agent capable of introducing Mg-halogen bonds into the organometallic Mg compound.

Examples of said halogenating compounds are: $SiCl_4$, halosilanes such as $ClSi(CH_3)_3$, $Cl_3SiCH_3$, $SOCl_2$, Alalkyl halides such as $Al(C_2H_5)Cl$, $Al(C_2H_5)Cl_2$, halides such as $AlCl_3$, $AlBr_3$, $SnCl_4$, $BF_4$, $BCl_3$, $SbCl_3$, $ZnCl_2$, hydrogen halides such as HCl, alkyl or aryl halides such as dichloroethane, chlorobenzene, $CCl_4$.

The amount of halogenating agent must be such as to cause the organometallic Mg complex to be converted into the dihalide in amounts higher than 10%.

The halogenating agent can be reacted with compound (d) either when the latter has already formed or when it is forming.

The decomposition with halogenating agents of the reaction product (d) is conducted, preferably, utilizing reaction products (d) in the form of solutions in hydrocarbons or of hydrocarbon-soluble complexes thereof.

The solvents preferably utilized are aromatic hydrocarbons such as toluene, benzene, xylene.

The product of the decomposition of the Mg compound in product (d) is preferably reacted with the compound (HED); the latter, however, can be reacted during the decomposition reaction of said Mg compound.

The reaction with the compound (HED) is advantageously conducted in the presence of the compound (ED). The latter, however, can be reacted either before, after, or, as already explained, during the reaction between the Ti compound and product (c).

One of the preferred methods of preparing the complex of this invention consists in decomposing the reaction product (d) or complexes thereof with a compound (ED) in order to obtain a product consisting of or containing a Mg dihalide or complexes thereof with ethers, and in successively reacting said product with the compound (HED) and the compound (ED) and then with the Ti compound.

According to a variant which is carried out prior to the reaction with the Ti compound, the adduct resulting from the Mg dihalide and compound (HED) can be decomposed to Mg dihalide by means of substances capable of reacting with the compound (HED) and of removing it from the adduct. Such substances are, for example, organometallic Al-compounds such as $Al(C_2H_5)_3$, $Al(C_2H_5)_2Cl$, halides of Si, Sn, etc.

The compound (HED) is selected from the aliphatic, cycloaliphatic or aromatic alcohols and thioalcohols having 1 to 20 C, the phenols having 6 to 20 C and the silanols having 1 to 20 C, and it is employed in such amounts, that the adduct, with the Mg dihalide, contains 0.1 to 6 moles of (HED) per mole of dihalide.

The complex prepared from Mg dihalide and (ED) employed in (c) contains up to 6 moles of compound (ED) per mole of Mg dihalide, and compound (ED) is preferably selected from the compounds in which the electron-donor group comprises at least one oxygen atom. For example, the compound (ED) is an alkyl ether such as, for example, ethyl, n-butyl, isoamyl ether.

In consequence of the aforesaid reaction there form, at least on the surface of the catalyst component, products of the reaction among at least a Mg dihalide, a Ti compound and a compound (ED), in which the ratio between the moles of (ED) and gram atoms of Ti is comprised between 0.2 and 4.

The halogenated Ti compound is preferably selected from the halides of tetravalent and trivalent Ti, in particular from $TiCl_4$, $TiBr_4$, $TiI_4$, $TiCl_3$ and the halo-alcoholates of Ti, such as, e.g., $Cl_2Ti(O-n-C_4H_9)_2$, $Cl_3TiOCH_3$.

Preferably, the Ti compound is liquid under the reaction conditions. To this purpose, the solid Ti compounds, such as, e.g., $TiCl_3$, are employed in solution in suitable solvents, which generally consist of electron-donor compounds such as for example, ethers, esters, amines, alcohols. In the latter case, the electron-donor compound utilized to solubilize the Ti compound can be used as compound (ED).

Electron-donor compound (ED) is preferably selected from the compounds in which the electron-donor group contains at least an oxygen atom.

Preferred compounds are the alkyl and aryl esters of aromatic carboxylic acids, the esters of silicic acid, the ethers, ketones and anhydrides of the aromatic carboxylic acids.

Some specific examples are the methyl, ethyl esters of benzoic, p-toluic and phthalic acid, $Si(OC_2H_5)_4$, di-n-butylether, ethyl-phenyl-ester, benzophenone.

The amount of electron-donor compound employed in the reaction is such that at least 0.5 up to 4 moles of said compounds remain fixed on the catalyst compound and are not extractable by treatment with $TiCl_4$ at 80° C. for 2 hours.

Compound (HED) is preferably selected from the aliphatic alcohols containing 1 to 12 carbon atoms such as, e.g., ethanol, n-butanol, 2-ethylhexanol, n-octanol and the phenols which are not ortho-substitutes such as, e.g., 4-t.butylphenol, p-cresol, beta-naphthol.

The silanols useful in preparing the catalyst component have been described hereinabove.

From the catalyst components of this invention it is possible to obtain catalysts for polymerizing olefins by reaction of said components with organometallic Al compounds such as, e.g., Al-trialkyls, Al-alkyl halides, such as $Al(C_2H_5)_3$, $Al(i-C_4H_9)_3$, $Al(C_2H_5)_2Cl$ or compounds $R_2Al-O-Al-R_2$, or mixtures of such Al compounds with organo-metallic Mg compounds, such as Mg-dialkyls or Mg-alkyl-alkoxy compounds.

The Al-Ti ratio is comprised in a wide range, for example from 1 to 1000.

For the stereoregular polymerization of the alpha-olefins $CH_2=CHR$, in which R is an alkyl or aryl radical having 1 to 8 carbon atoms, the compounds preferably employed as second catalyst-forming components are Al-trialkyl compounds especially when combined in the form of complexes with an electron-donor compound (ED) employed in amounts of from 0.01 to 1 mole per mole of Al-alkyl compound.

When the Al/Ti ratio is maintained at values lower than about 30, the Al-alkyl compound is not reacted with the electron-donor compound, or the latter is used in small amounts, lower than 0.3 moles per mole of Al-alkyl compound. The alpha-olefins are preferably selected from propylene, butene-1 and mixtures thereof with ethylene.

In the case of the polymerization of ethylene or of mixtures thereof with alpha-olefins $CH_2=CHR$, in which R is an alkyl radical having 1 to 6 carbon atoms, Al-trialkyl compounds or Al-dialkyl-monohalide compounds are employed.

The polymerization of the alpha-olefins and of mixtures thereof is carried out according to known methods, by operating in liquid phase in the presence, or in the absence, of an inert hydrocarbon solvent, or in the gas phase.

The polymerization temperature is in the range of from 50° to 150° C. It is carried out at atmospheric pressure, or under pressure.

The following examples are given for illustrative purposes, without being, however, intended as limiting.

EXAMPLE 1

(A) Reaction Between the Organometallic Mg Compound and the Si Compound 140 ml of a solution of 1.7 M of $n-C_4H_9MgCl$ in tetrahydrofuran (THF) were introduced, in a $N_2$ atmosphere, into a 500 cc flask equipped with a magnetic stirrer, a thermometer and a dropping funnel. 16.2 ml of polymethyl hydrosiloxane (BAYSILON NH 15 corresponding to 238 mg atoms of Si-H) were gradually added dropwise, so that the temperature did not exceed 50° C.

At the end of the addition, the mass was heated at reflux and allowed to react for 1 hour and 30 minutes. The solid was separated by filtration and washing with n-heptane at 70° C.

(B) Decomposition of Reaction Product (d) Obtained in (A) with Halogenating Agents 20.48 g of the reaction product prepared under (A) were solubilized in 330 cc of anhydrous toluene at room temperature and 22.6 ml of $SiCl_4$ were added dropwise. The whole was reacted for 1 hour and 30 minutes at 60° C.

The solid product was separated by filtration and subjected to 5 washings with portions of 500 ml each of n-heptane.

From the elementary analysis of the dried solid it resulted that the Mg content was equal to 16.4% by weight.

(C) Reaction Between the Decomposition Product of (B) and HED 6.6 g of the reaction product obtained according to the method of (B) were introduced into a flask as described in (A) and, in a nitrogen atmosphere, 60 cc of n-heptane and 90 mmoles of ethanol were introduced. The temperature was brought to 60° C. and the reaction was conducted for 2 hours. The product obtained was separated by filtration and washed with n-heptane.

(D) Reaction with $TiCl_4$ 11 ml of a heptane solution of 1 M of ethyl benzoate (ED) and 110 ml of $TiCl_4$ were introduced, in a nitrogen atmosphere, into the flask containing the product obtained by procedure (C). The whole was heated to 110° C. and reacted for 2 hours.

$TiCl_4$ was removed by filtration at 110° C. and an equal amount thereof was added again. After 2 hours it was hot-filtered and washed with n-heptane at 90° C. until chlorine ions disappeared from the filtrate.

The elementary analysis of the dried solid showed a Ti content of 3.48% by weight and a Cl content of 55.2% by weight.

(E) Polymerization Test

The data relating to the propylene polymerization test carried out using, as solid catalytic component, the compound of (D) are reported in Table 1.

The polymerization of propylene was conducted under the following conditions: 5 millimoles of a mixture of aluminum-trialkyls having the composition of the gases (percent by volume) after hydrolysis:
ethane=9.
isobutane=49.4
n-butane=41.2
propane=0.16
isobutene=0.24
were reacted at room temperature with 1.25 millimoles of methyl para-toluate in 80 ml of n-heptane (anhydrous desulphurated) for 5 minutes. 50 ml of such solution were contacted with a suitable amount of the catalyst component as indicated in Table 1. The remaining 30 ml were diluted in 1000 ml with n-heptane and introduced, under a nitrogen pressure, into a steel autoclave having a capacity of 3000-ml, equipped with a magnetic anchor stirrer and a thermometer, and thermoregulated at 50° C., and into which propylene was made to flow.

The suspension of the catalytic component was then introduced in the same manner. After closing of the autoclave, hydrogen was added to a partial pressure of 0.3 atm., whereupon it was heated to 70° C. under simultaneous feeding of propylene up to a total pressure of 7 atmospheres. Such pressure was maintained constant all through the polymerization by feeding of the monomer.

Polymerization was stopped after 4 hours and polypropylene was isolated by treatment with methanol and acetone.

The results of the polymerization test conducted under the above conditions and using the catalytic component described are reported in Table 1.

EXAMPLE 1A

The importance of reacting the product (B) with a compound HED, was demonstrated in example 1A, made without effecting the reaction (C).

Preparation of the Catalyst Component

Operation was as described in Example 1 without effecting the reaction (C) between the product of (B) and compound HED.

6.5 g of the product obtained according to (B) and 60 ml of n-heptane were introduced into the flask described in Example 1, 140 ml of $TiCl_4$ were dropped in and the whole was reacted for 1 hour. 6.85 cc of a 1 M heptane solution of ethyl benzoate, diluted with n-heptane to 12 cc, were dropped and reaction was continued for 2 hours at 110° C.

$TiCl_4$ was removed by filtration at 110° C. and an equal amount thereof was added. After 2 hours, the $TiCl_4$ was removed by filtration, whereupon the solid mass was washed with n-heptane at 70° C.

On analysis the dried solid showed the following percentages by weight: Ti=1.88%; Cl=51%.

Polymerization Test

Polymerization was conducted under the same conditions as specified in Example 1.

The data relating to the propylene polymerization test carried out by using, as catalytic component, the component described in this Example 1A are reported in Table 1.

The data in Table 1 show the unexpected benefits obtained by reacting the product of (B) with a compound HED during the preparation of the catalyst component. Example 1A is a control run showing the results obtained without effecting the reaction (C). In Example 1, where reaction (C) is effected, a very large increase of productivity was unexpectedly obtained with the same isotacticity index.

EXAMPLE 2

Preparation of the Catalyst Component 100 millimoles of the reaction product obtained according to (B) of Example 1 were suspended in 100 ml of a heptane solution containing 17 millimoles of ED and 100 millimoles of $C_2H_5OH$ and the whole was allowed to react at 60° C. for 2 hours.

After filtration and 3 washings with portions of 200 cc each of n-heptane, the resulting solid was suspended in 200 ml of $TiCl_4$ and reacted at 110° C. for 2 hours.

$TiCl_4$ was removed by filtration at 110° C. and an equal amount thereof was added, whereupon it was reacted at 120° C. for 2 hours. It was filtered at 110° C. and the solid was washed with n-heptane at 90° C. until chlorine ions disappeared from the filtrate.

On analysis, the dried solid revealed the following percentages by weight: Ti=2.3%; Cl=63.5%.

Polymerization Test

Polymerization was conducted under the same conditions as in Example 1. The data relating to the propylene polymerization test employing the catalyst component of Example 2 are recorded in Table 1.

EXAMPLE 3

Example 2 was repeated using, instead of $C_2H_5OH$, an equimolecular amount of n-butanol.

On analysis, the dried solid showed a percentage by weight of Ti=1.90% and of Cl=59.5%.

The data relating to the polymerization test are reported in Table 1.

EXAMPLE 4

Example 1 was repeated using, instead of $C_2H_5OH$, an equimolecular amount of $n-C_4H_9OH$.

On analysis the dried solid showed the following percentages by weight: Ti=2.87%; Cl=56.7%.

The data concerning the polymerization test are reported in Table 1.

EXAMPLE 5

Example 1 was repeated using in (A), instead of polymethyl-hydrosiloxane, triphenylsilanol in such amount that the molar ratio between the OH groups of triphenylsilanol and the $C_4H_9$ groups of $n-C_4H_9MgCl$ was equal to 1.

On analysis, the dried solid showed a Ti content of 3.3% by weight.

The data relating to the polymerization test employing the above described component as one catalyst component are reported in Table 1.

EXAMPLE 6

Example 5 was repeated employing, instead of triphenylsilanol, an equimolecular amount of trimethylsilanol.

On analysis, the dried solid showed a Ti content of 4% by weight.

The data relating to the polymerization test employing the component of this Example 5 as catalytic component are recorded in Table 1.

EXAMPLE 7

Example 1 was repeated employing in (A), instead of polymethyl-hydrosiloxane, α,ω-dihydroxydimethyl polysiloxane in an amount such that the molar ratio between the OH groups contained in this polysiloxane and the $C_4H_9$ groups of n-$C_4H_9MgCl$ was equal to 1.

On analysis the dried solid showed a Ti content of 2.2% by weight.

TABLE 1

| | Polymerization of Propylene | | | | |
|---|---|---|---|---|---|
| Example No. | Catalyst component g | Yield kg PP/g Ti | Yield g PP/g cat. | η inh (dl/g) | Isotacticity index % |
| 1 | 0.098 | 120.6 | 4196 | 1.69 | 94.3 |
| 1A | 0.076 | 53. | 1000 | 1.61 | 94.2 |
| 2 | 0.072 | 230. | 5290 | 1.50 | 91.8 |
| 3 | 0.067 | 188. | 3572 | 1.66 | 91.4 |
| 4 | 0.080 | 135. | 3875 | 1.59 | 94.0 |
| 5 | 0.070 | 110.5 | 3646 | 1.7 | 94.0 |
| 6 | 0.090 | 80. | 3200 | 1.72 | 93.7 |
| 7 | 0.080 | 150. | 3300 | 1.65 | 94.3 |

What we claim is:

1. Components of catalysts for polymerizing olefins comprising the solid product of the reaction of:
(a) a halogenated Ti compound containing at least a Ti-halogen bond, and
(b) an electron-donor compound not containing active hydrogen atoms (ED) reacted as such or as a complex with product (c), said complex being obtained without cogrinding, and employing in such amount, that from 0.2 to 4 moles of compound (ED) per gram atom of Ti of component (a) are present in the catalytic component with
(c) the solid product, prepared without cogrinding, of the reaction between at least an electron-donor compound containing active hydrogen atoms (HED), selected from aliphatic, cycloaliphatic and aromatic alcohols and thioalcohols having 1 to 20 C, phenols and thiophenols having 6 to 20 C and the silanols having 1 to 20 C, and a Mg dihalide, or complexes thereof with an (ED) compound, said Mg dihalide being obtained by decomposition, with halogenating agents other than the Ti compounds of (a), of reaction product (d) of an organometallic Mg compound of general formula $R_mMgX_n$, in which R is an alkyl, aryl, cycloalkyl or alkenyl radical having 1 to 20 C, or a group OR, and X is a halogen, R, OR in which R has the meaning as specified or COX' in which X' is a halogen, m is $0<m\leq2$, n is $0<n<2$ and $M+n=2$; with a silicium compound selected from polysiloxanes, hydropolysiloxanes, silanols and polysilanols, product (c) being reacted as such without any intermediate pretreatment with an Al-alkyl compound.

2. Catalytic components according to claim 1, in which compound (a) is a Ti tetrahalide, compound (ED) employed in (b) is an alkyl, aryl or cycloalkyl ester of benzoic acid or derivatives thereof, product (c) is obtained by reacting 0.1 to 6 moles of an aliphatic alcohol or of a phenol with 1 mole of Mg dichloride or dibromide or complexes thereof with ethers, obtained by decomposition, with halogenating agents selected from the group consisting of halogenated compounds of Si, $SOCl_2$, $AlR_3$ or $AlR_2X$ in which R is an alkyl radical and X is halogen of reaction product (d).

3. Catalysts for polymerizing olefins, prepared by reacting the catalyst components of claims 1 or 2, with organometallic Al compounds.

4. Catalysts according to claim 3 in which the organometallic Al compound is an Al trialkyl compound.

5. Catalysts according to claim 4, in which the Al-trialkyl compound is complexed by reaction with 0.1 to 1 mole of electron-donor compound (ED).

6. The components of claim 1 in which, in the formula $R_mMgX_n$, X is chlorine, bromine or iodine.

* * * * *